US010504147B1

(12) United States Patent
Johnson et al.

(10) Patent No.: US 10,504,147 B1
(45) Date of Patent: Dec. 10, 2019

(54) ENHANCED PERMISSIONS MANAGEMENT

(71) Applicant: Amazon Technologies, Inc., Reno, NV (US)

(72) Inventors: Albert Cooper Johnson, Seattle, WA (US); Taylor James White, Seattle, WA (US)

(73) Assignee: AMAZON TECHNOLOGIS, INC., Seattle, WA (US)

( * ) Notice: Subject to any disclaimer, the term of this patent is extended or adjusted under 35 U.S.C. 154(b) by 1191 days.

(21) Appl. No.: 14/640,996

(22) Filed: Mar. 6, 2015

(51) Int. Cl.
*G06Q 30/02* (2012.01)

(52) U.S. Cl.
CPC ................ *G06Q 30/0257* (2013.01)

(58) Field of Classification Search
CPC ..................................... G06Q 30/00
USPC ............................................ 705/14
See application file for complete search history.

(56) References Cited

U.S. PATENT DOCUMENTS

| | | | | |
|---|---|---|---|---|
| 5,966,715 A * | 10/1999 | Sweeney | ............... | G06F 21/604 |
| 8,209,742 B2 * | 6/2012 | Schreiber | ............... | G06F 17/10 |
| | | | | 726/2 |
| 9,202,084 B2 * | 12/2015 | Moore | ............... | G06F 21/6245 |
| 2003/0172161 A1 * | 9/2003 | Rymon | ............... | G06Q 10/10 |
| | | | | 709/226 |
| 2009/0106822 A1 * | 4/2009 | Obasanjo | ............... | G06Q 10/107 |
| | | | | 726/4 |
| 2014/0344953 A1 * | 11/2014 | Roundtree | ............... | G06F 21/10 |
| | | | | 726/28 |

OTHER PUBLICATIONS

Hobbs T.L., Winsborough W.H. (2010) Implementation and Performance Analysis of the Role-Based Trust Management System, RTC. In: Nishigaki M., Jøsang A., Murayama Y., Marsh S. (eds) Trust Management IV. IFIPTM 2010. IFIP Advances in Information and Communication Technology, vol. 321. Springer, Berlin, Heidelberg.*
Bakhshandeh R, Samadi M, Azimifar Z, Schaeffer J. Degrees of Separation in Social Networks. In: Proceedings of the fourth annual symposium on combinatorial search (SoCS). Barcelona, Spain; 2011. p. 18-23.*
I. Pohl. Bi-directional and heuristic search in path problems. Technical report, Stanford Linear Accelerator Center, 196.*
A. Madkour, W.G. Aref, F.U. Rehman, M.A. Rahman, S. Basalamah, A survey of shortest-path algorithms, 2017. (Year: 2017).*

* cited by examiner

*Primary Examiner* — Eric R Netzloff
(74) *Attorney, Agent, or Firm* — Hogan Lovells US, LLP (57) ABSTRACT

Systems and methods are described for authorizing access to resources to entities by representing objects in a graph database. Entities and resources are represented by nodes in the graph, and permissions by edges connecting the nodes. Nodes may be grouped into groupings, the inclusion of a node in a group being represented by an edge. The graph comprises one or more bipartite graphs, such that nodes of one set do not have edges connecting nodes in the set. Navigation of the graph is performed to determine permissions for the entity to access the resources, such as by utilizing edges and inverse edges in the graph to walk a path to the center of the graph, the edges being associated with the permission required to perform the access.

4 Claims, 9 Drawing Sheets

ENHANCED PERMISSIONS MANAGEMENT

BACKGROUND

Online advertising has matured into a complex science involving data collection, management, and targeting. Advertisers desire access to demographic data in order to create, manage, and evaluate their online advertising approaches. Because of the personal nature of much of the data, which may include demographic information on individuals and groups, it is important to restrict access to the data only to authorized individuals or groups. The amount of additional data corresponding to online advertising can be overwhelming; for example, every product in an online merchant's inventory may be part of the data, which could number in the millions. Owners of the data and those who provide platforms for managing and distributing online advertising may desire to segment the various portions of data for access purposes, for example making different types and amounts of data available to different customers.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to creating and managing permissions, for example in a database. In accordance with various embodiments, entities who wish to have access to various resources, such as advertisers who want to create and manage online advertising campaigns, are represented as nodes in a graph data structure, permission store, or graph store. The resources to which access is requested are also represented as nodes in the graph. According to various embodiments, edges in the graph connect nodes, and may be used to represent permissions between the nodes, such as membership in a group, being contained by another group, and various permissions to perform actions that the entity represented by one group has on the other group. In some embodiments, the edges are directed edges, and each edge is accompanied by an inverse directed edge.

According to various embodiments, identifying the existence of a permission can be performed in a much more efficient manner than current approaches provide. Current approaches for managing permissions, such as permission stores, that use group-based systems do not scale because of the tremendous cost of traversals in terms of processing. Attempting to traverse a graph in a naive path-following approach with millions or billions of nodes at a far end of the graph can prove difficult at best. Current approaches that do scale with increased nodes restrict permissions to point-to-point instead of being group-based.

Various embodiments described herein use one or more bipartite graphs to represent groupings and collections of various nodes. Actor nodes and resource nodes may be collected into groups, for example by using edges to indicate an "ownership" or other type of relationship between nodes. Once the actors, resources, and permissions are modeled in the graph, determinations of permissions may be made; for example, an entity wishes to access a resource. Determining whether a node has a particular permission on the requested resource in various embodiments involves identifying a name associated with the permission, and identifying an edge in the graph having the same name that exists on a path between the actor node and the resource node. By using a bipartite graph of groups of actor nodes and resource nodes, traversing the graph in order to determine such a path may be accomplished by walking inwards along the edges. For example, it may be determined that an actor node is part of a particular group of actor nodes, and that the requested resource is associated with a group node of resource nodes. It is then determined whether an edge with a name corresponding to the permission exists between the group nodes. This increases the efficiency of the computing system and improves the performance of an advertising management system.

Other variations, functions, and advantages are described and suggested below as may be provided in accordance with the various embodiments.

Figure 1:
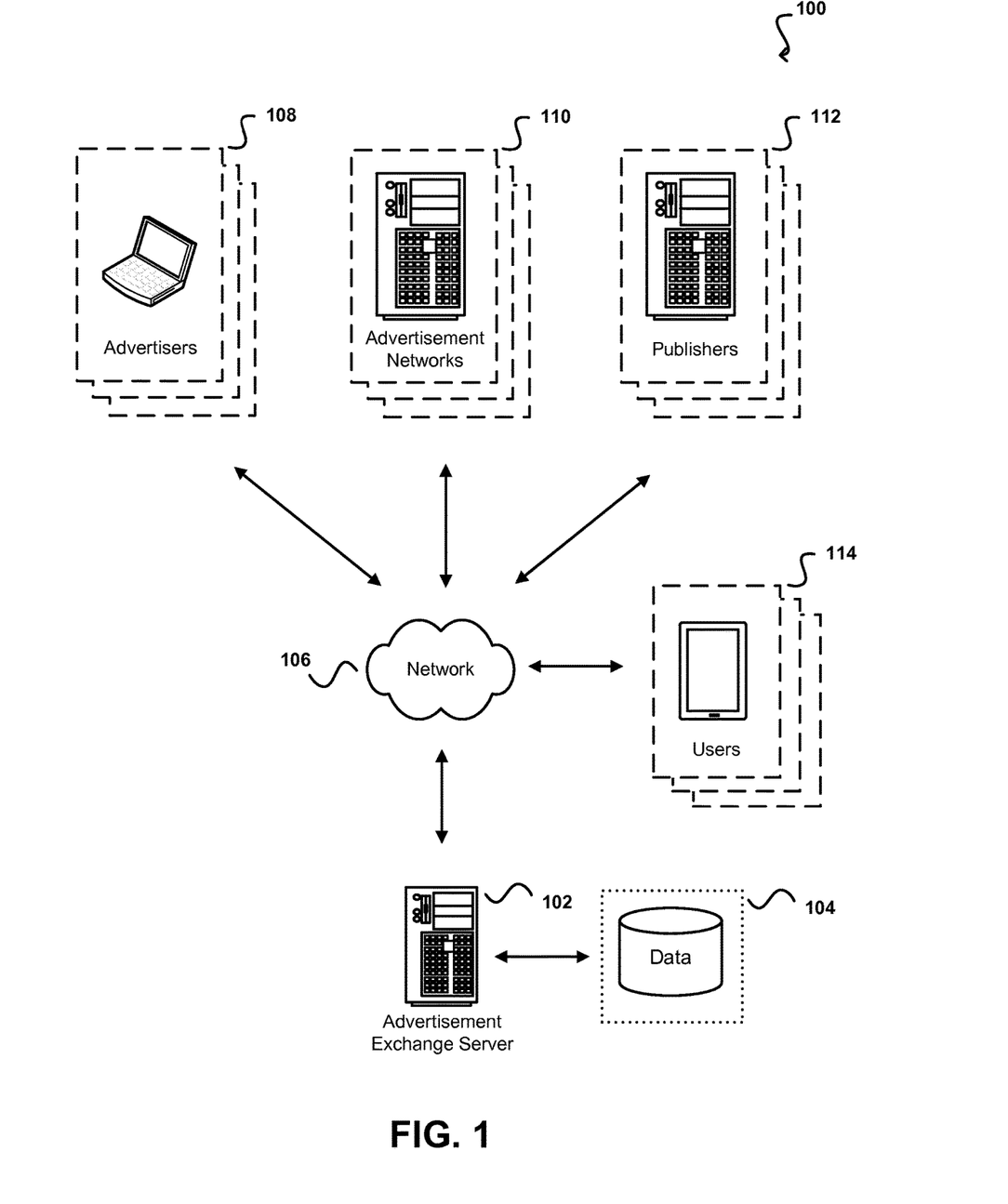
FIG. 1 illustrates an example environment for implementing aspects in accordance with various embodiments

FIG. 1 illustrates an example environment 100 for implementing aspects in accordance with various embodiments. The example environment 100 includes an electronic content exchange server (e.g., "ad exchange") 102, advertisers 108, advertisement networks 110 ("ad networks"), content publishers (e.g., websites) 112, and users 114 of users accessing content publishers. Advertisers 108, ad networks 110, and publishers 112 are able to utilize respective computing systems and/or devices to interact with the ad exchange 102 through the network 106, for example, a local area network (LAN) or wide area network (WAN), e.g., the Internet. Similarly users 114 are able to utilize their respective computing devices to access content (e.g., websites) that may be offered through the publishers 112 over the network 106. Such publishers 112 can provide content (e.g., web pages, etc.) that is accessible over the network 106 (e.g., the Internet). For example, a publisher 112 may utilize one or more computing systems to provide a website that is accessible through the network 106. The publisher's website may offer opportunities to present additional content to users accessing the website, for example, in the form of electronic advertisements. The computing devices and/or systems for each of the ad exchange 102, advertisers 108, ad networks 110, publishers 112, users 114, 202 will each generally include memory for storing instructions and data, and at least one processor for executing the stored instructions.

Typically, when a user 114 utilizes a computing device to access content from the publisher 112, the publisher's system can send, to the ad exchange 102, a request for an advertisement to be presented with the content being accessed by the user. This request can include various information about the publisher 112 (e.g., type of content being provided, etc.), the user 114 (e.g., gender, age group, interests, etc.), and/or other contextual information (e.g., any search terms in a query submitted by the user, etc.). Typically, the ad exchange 102 can facilitate an electronic auction among the advertisers 108 and/or ad networks 110 to automatically determine which advertisement should be provided to the publisher's system in response to the advertisement request. Such an auction can generally be performed automatically using various constraints (e.g., maximum bids) specified by the advertisers 108 and/or ad networks 110 and the highest bidder is typically deemed the winner of the auction. Once the auction is complete, the winning advertisement is provided to the publisher's system in response to the advertisement request to be displayed, as an impression, with the publisher's content. The publisher's system can then provide the advertisement together with the content being browsed by the user 114. Various payment approaches may be utilized to pay the publisher. For example, a portion of the bid price can be paid to the publisher per impression (i.e., cost per impression or cost per mille), per click (i.e., cost per click), per conversion, etc.

Figure 2:
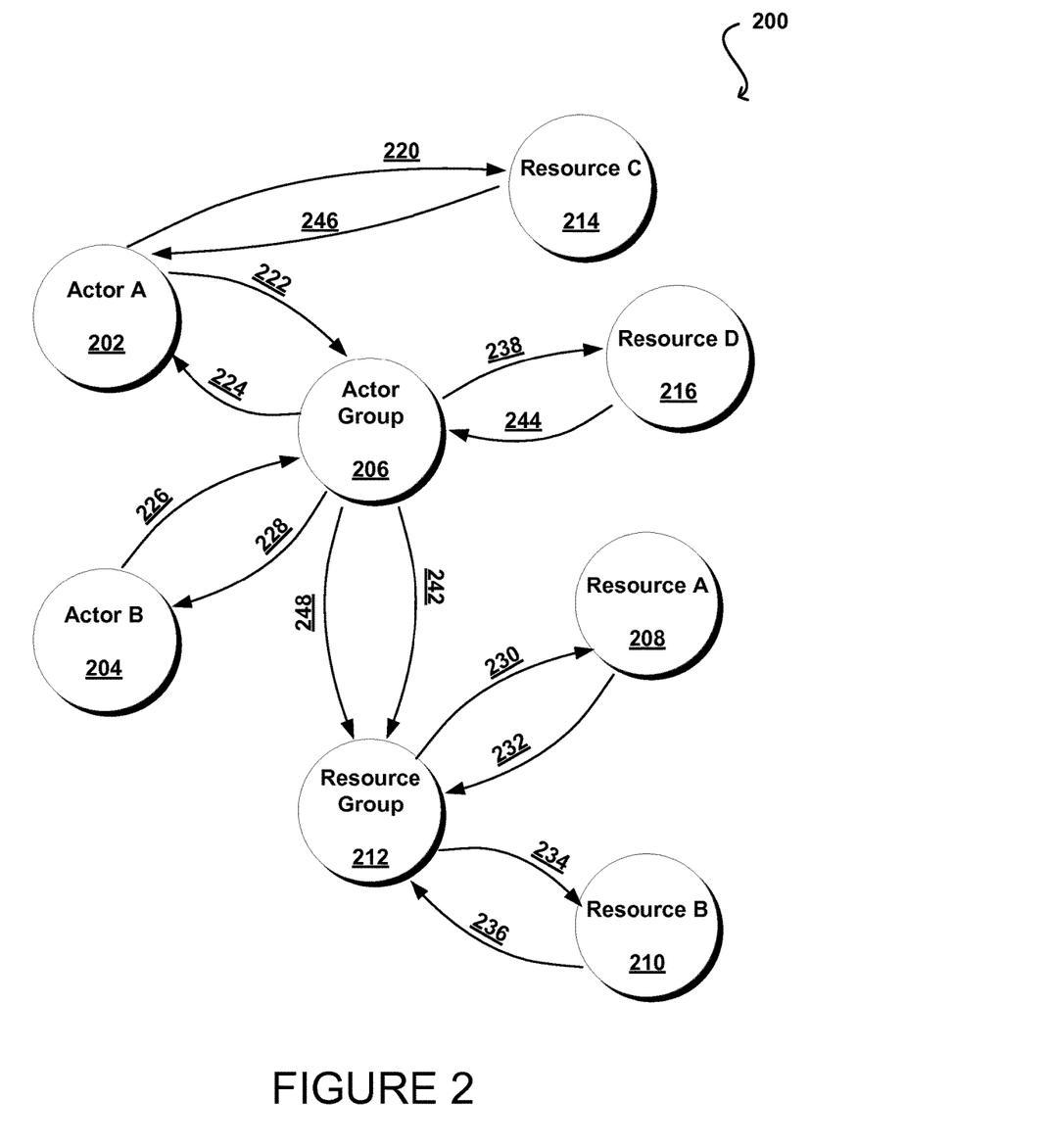
FIG. 2 illustrates a high-level example of a data model for creating and managing permissions, according to various embodiments.

As illustrated in the example of FIG. 2, in some instances, in addition to constraints specified by advertisers and/or ad networks 208, the ad exchange 202 may also need to satisfy constraints 222 specified by publishers 212 (e.g., "Publisher A").

FIG. 2 illustrates a high-level example 200 of a data model for creating and managing permissions, according to various embodiments. While the example of FIG. 2 is represented as a directed graph, it should be understood that various techniques may be utilized to create and store data representing the directed graph and the relationships between the nodes represented in FIG. 2. In this example, numerous nodes 202-216 representing various entity objects and group objects in the data model corresponding to the permissions store are illustrated, along with numerous edges 220-242 connecting the nodes representing a relationship (e.g., existence of a permission) between the nodes.

In the example of FIG. 2, the nodes can represent different types of objects: entity objects and group objects. Actor nodes such as Actor A 202 and Actor B 204 may represent an entity desiring access to a resource in the example environment 200. Examples of entities represented by actor nodes may be a user, a company, a business unit or other subdivision with a company, an advertiser, etc. Resource nodes such as Resource A 208 and Resource B 210 may represent entities for which permission to access is desired. Examples of resources represented by resource nodes may be an advertising segment (e.g., a group of customers who share common characteristics, as will be described more fully herein), an identifier for a product (e.g., a UPC code or other type of unique identifier), an advertisement, etc. According to an embodiment, entity nodes such as Actor nodes 202, 204 and Resource nodes 208, 210 represent something that exists outside the permission store; e.g., people, companies, advertisers, demographic data, unique item identifiers, etc.

Groups, represented by Group nodes, such as Actor Group 206 and Resource Group 212, can be used to represent an association, or grouping, of multiple entities in the data model. For example, Actor Group 206 may group Actor A 202 and Actor B 204 together, and Resource Group 212 may group Resource A 208 and Resource B 210 together. According to an embodiment, Group nodes are objects specific to the permission model and are used to associate multiple entities together that share permissions (e.g., all resources in a particular Group may be accessed by the public at large as opposed to only by a particular user). According to various embodiments, entities such as Actor nodes 202, 204 and Resource nodes 208, 210 may be a member of multiple Groups, and Groups may contain multiple entities.

In the example of FIG. 2, nodes are connected by edges 220-248. According to various embodiments, edges are a connection between two objects in the graph that represent a relationship between the entities represented by the connected nodes. For example, an edge may represent a permission that one object has on another object. This permission may take different forms; for example, one permission may represent membership of one object with regard to another object. Another permission may represent that a node is contained within another node; i.e., one node comprises "contents" of the other node. Another permission may represent that a node has the authority or access to perform some act with regard to the other node; e.g., an entity represented by one node having an edge to another node may have permission to access data represented by the other node. The absence of an edge between nodes indicates no direct relationship between the nodes; e.g., an Actor node without an edge to a Resource node will not be allowed to access the Resource node, unless the Actor node and/or the Resource node have Group memberships that ultimately imply a relationship, as discussed further herein.

In an embodiment, the edges are directed edges, the direction implying that the starting node has a permission on the ending node. In some embodiments, each directed edge from one node to another is mirrored by an inverse directed edge, while in other embodiments, less than each directed edge may have an inverse edge. In some embodiments, no inverse edges are utilized, while in other embodiments, only certain types of nodes or group nodes are connected by inverse edges. While not depicted in FIG. 2, each edge may have an associated name that represents the nature of the permission. For example, an edge from one entity node to a group node that represents that the entity node is a member of the group node may be named "Member." This name may be utilized in a data store corresponding to the graph to represent all permissions of a certain type.

Turning to the example of FIG. 2, the node representing Actor A 202 has a directed edge 222 to the node representing Actor Group 206. This edge 222 denotes a permission that Actor A 202 has on Actor Group 206, which in this case denotes that Actor A 202 is a member of Actor Group 206. As discussed above, this edge 222 may have an associated name such as "Member" to represent this particular relationship. As also discussed above, an inverse edge 224 between nodes exists in some embodiments, the inverse edge being created in response to an edge between the nodes being initially established. In this example, edge 224 between Actor Group 206 and Actor A 202 indicates that Actor A 202 is "contents" of Actor Group 206. This edge 224 may have an associated name such as "Contents" to represent this particular relationship. Similarly in FIG. 2, the node representing Actor B 204 has a directed edge 226 to the node representing Actor Group 206, the permission corresponding to the edge 226 denoting that Actor B 204 is a member of Actor Group 206. Edge 228 between Actor Group 206 and Actor B 204 indicates that Actor B 204 is "contents" of Actor Group 206.

With regard to the resources depicted in the example of FIG. 2, the node representing Resource Group 212 has a directed edge 230 to the node representing Resource A 208.

This edge 230 denotes a permission that Resource Group 212 has on Resource A 208, which in this case denotes that Resource A 208 is "contents" of Resource Group 212. As discussed above, this edge 232 may have an associated name such as "Contents" to represent this particular relationship. As also discussed above, an inverse edge between nodes exists in some embodiments, the inverse edge being created in response to an edge between the nodes being initially established. In this example, inverse edge 232 between Resource A 208 and Resource Group 212 indicates that Resource A 208 is a "member" of Resource Group 212. This edge 232 may have an associated name such as "Member" to represent this particular relationship. Similarly in FIG. 2, the node representing Resource Group 212 has a directed edge 234 to the node representing Resource B 210, the permission corresponding to the edge 234 denoting that that Resource B 210 is "contents" of Resource Group 212. Inverse Edge 234 between Resource Group 212 and Resource B 210 indicates that Resource B 210 is a "member" of Resource Group 212.

In the example of FIG. 2, Actor Group 206 has an edge 242 to Resource Group 212, indicating a permission that Actor Group 206 has with regard to Resource Group 212. According to an embodiment, edges that denote membership or contents apply permissions transitively, such that an entity has all the permissions of the groups of which it is a member, and all entities that have permission on a group have the same permissions on the contents of that group. For example, the edges 222, 226 in FIG. 2 denoting that Actor A 202 and Actor B 204 are members of the Actor Group 206, along with the edges 230, 234 denoting that Resource A 208 and Resource B 210 are contents of Resource Group 212, result in Actor A 202 and Actor B 204 sharing the same set of permissions due to their membership in the Actor Group 206. Similarly, all entities that have permissions on Resource Group 212 have the same permissions on Resource A 208 and Resource B 210, due to Resource A 208 and Resource B 210 being contents of Resource Group 212.

As a result, the permission represented by the edge 242 that Actor Group 206 has on Resource Group 212 applies to the members and contents of the groups, respectively. An inverse edge 248 is also illustrated with regard to the relationship of Actor Group 206 and Resource Group 212. Example permissions represented by edge 242 could be "view," "edit," "can target," "get analytics," etc., as will be discussed herein. If the permission represented by edge 242 is "view," then Actor B 204 has a permission to "view" Resource B 210, by virtue of Actor B 204 being a member of Actor Group 206, which has a "view" permission on Resource Group 212 (as represented by edge 242), and Resource B 210 being contents of Resource Group 212. In some embodiments, an entity and/or group may have a permission directly on a resource, which is illustrated in FIG. 2 by edge 220 from Actor A 202 to Resource C 214. Because the only path between Actor A 202 and Resource C 214 is traversed via edge 220 and inverse edge 246, only Actor A 202 has the permission on Resource C 214 represented by edge 220. Similarly, Actor Group 206 has a permission on Resource D 216, as represented by edge 238 (and inverse edge 244). Because Actor A 202 and Actor B 204 are members of Actor Group 206, each of Actor A 202 and Actor B 204 share the permission on Resource D 216. However, an entity such as an Actor node that is neither a member of Actor Group 206, nor has a path to Resource D 216 via one or more edges, has no permissions on Resource D 216.

Figure 3A:
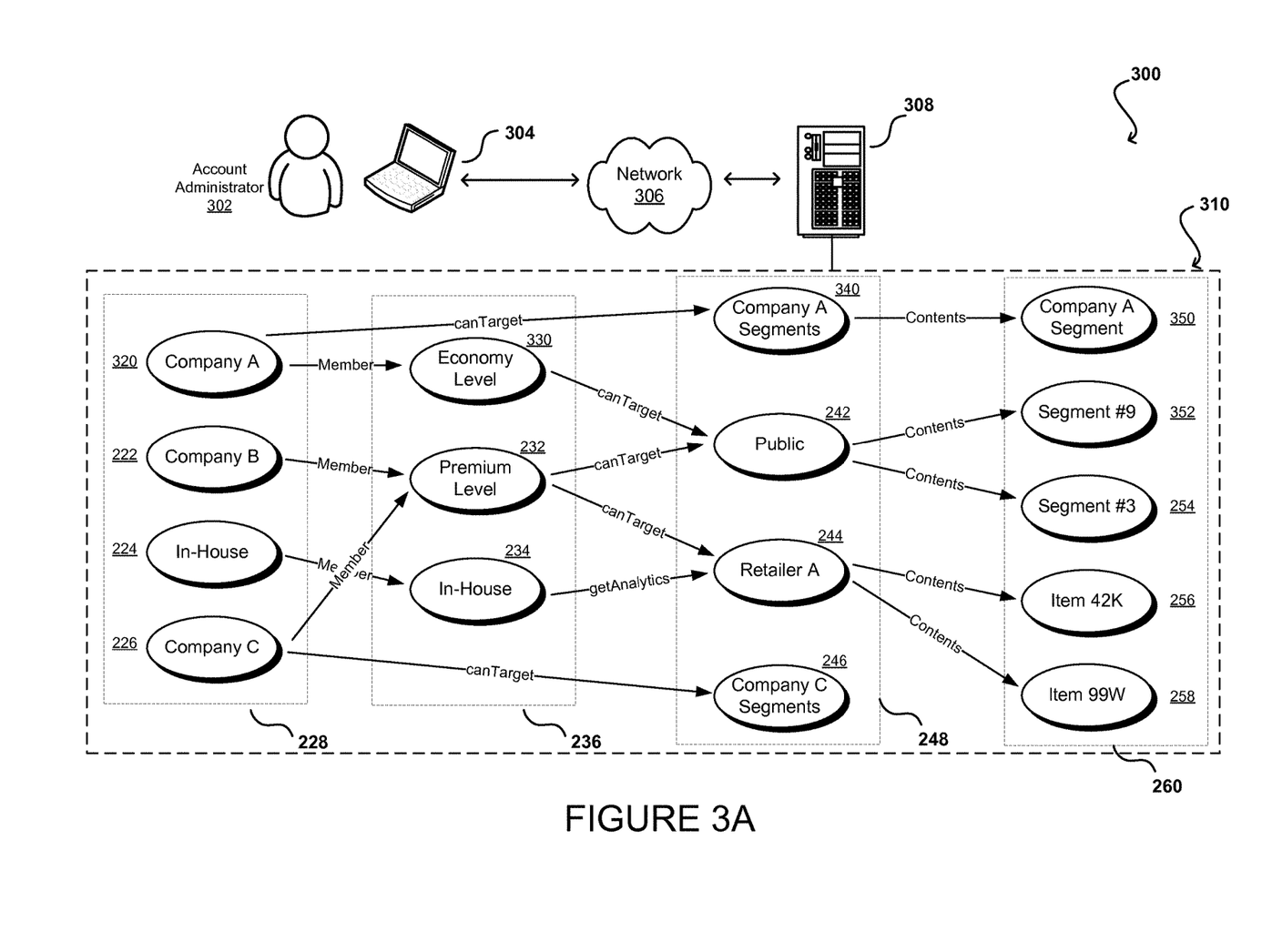
FIGS. 3A-3C are an example illustration of using an enhanced permissions management approach in accordance with various embodiments.

FIG. 3A illustrates an example 300 of a user utilizing an enhanced permissions management approach in accordance with various embodiments. An account administrator 302 may in various embodiments be a single user, a group of users, an automated process, or other user of a computing system. In the example illustrated by FIG. 3A, Account Administrator 302 is an employee of a company called "Company B," and desires to create a new advertising campaign for Client B targeting a particular advertising segment. For purposes of this disclosure, an advertising "segment" may be thought of as, for example, a group of items with a common feature, or a set of demographic data, or a customer list. For example, a "set of males, ages 21-25, with over $50,000 annual income" would be an example of a segment. Another example is "people who are interested in purchasing a new car." Another example would be segments related to identifying users whose purchasing history can be used to generate predictions of future purchases. While the techniques described herein will be discussed in the context of advertising management, it should be understood that the techniques are not so limited, and may be utilized in a wide variety of approaches; for example, any system that requires examining permissions in order to grant access to various resources.

In various embodiments, Account Administrator 302 accesses an advertising management system via a computing device 304, such as a laptop computer. The advertising management system may be accessed through a web interface or a dedicated application, for example. The advertising management system connects over a network 306 to a computing system 308, for example belonging to an online retailer called "Retailer A." Retailer A offers numerous products for sale from many different companies, for example Company B.

In various embodiments, entities such as companies, users, clients, in-house groups, etc. are represented by nodes 320-326 in the graph store 310. As discussed earlier, according to various embodiments, each node in the graph represents an object in the permissions model. For example, nodes may represent entities such as advertisers, companies, users, items, segments, etc. Also, nodes may represent groups, which can be representative of collections of entities. Each edge in the graph represents a relationship between the underlying entities represented by the nodes connected by the edge, such as between an "actor" and a "resource," as previously discussed.

In an embodiment, each edge may be directed, and may be associated with a name that corresponds to a particular type of permission. For example, "member" edges in FIG. 3A represent a relationship between the connected nodes, such that the entity represented by the node from which the edge emanates is a member of the group represented by the node at which the edge terminates. In another example, "contents" edges in FIG. 3A represent a relationship between the connected nodes, such that the group represented by the node from which the edge emanates contains the entities represented by the node at which the edge terminates.

According to various embodiments, each edge is associated with a name representing the permission corresponding to the node. Multiple edges, each representing a different type of permission, may connect two particular nodes. In an embodiment, a particular permission between two nodes exists if an edge corresponding to the permission connects the nodes or if a traversal through an allowed list of traversals exists between the nodes. For example, a first node that is a member of a group (i.e., a "member" edge exists between the first node and the group node) having a particular permission on a second node (i.e., an edge corresponding to the permission exists between the group and the second node) results in the first node having the particular permission on the second node.

In the example of FIG. 3A, there are different types of entities represented by nodes. The Company A node 320, Company B node 322, In-House node 324, and Company C node 326 are actor nodes 328. In this example, the graph store 310 is used to create and manage permissions related to advertising on the website of "Retailer A." Company A 320 may be thought of as a product manufacturer offering products for sale at Retailer A, Company B 322 may be thought of as a book publisher offering books for sale at Retailer A, and Company C 326 may be thought of as a product reseller, selling used products at Retailer A. Another entity in the example of FIG. 3A is an In-House node 324, representing employees of Retailer A.

In the example of FIG. 3A, each of the actor nodes 328 have member edges ending on one other node, denoting the respective actor nodes 328 being members of the group on which their member edges end. In some embodiments, entities such as the actor nodes 328 may have multiple edges emanating from them (e.g., the actor nodes may be members of multiple groups or may have permissions on other entities, such as other group nodes and/or resource nodes).

Company A node is a member of Economy Level 330 group, Company B node 322 is a member of Premium Level node 332, In-House node 324 is a member of In-House group 334, and Company C node 326 is a member of Premium Level group 332. In addition, Company A node 320 and Company C node 326 each have an edge to another group node, but these edges represent a permission called "canTarget," which will be discussed further herein.

The group nodes 336 each can be thought of as a group of entities, such as the actor nodes 328. The Group Nodes 336 in the example of FIG. 3A can be thought of as all those entities that have paid for a certain level of access in the advertising system. Economy Level group node 330, can be thought of as a group of entities (such as manufacturers, clients, etc.). For example, Economy Level entities may be entitled to certain permissions, but not others that are reserved for clients who pay more, such as "Premium Level" 332 clients. In various embodiments, any number of group nodes may be utilized to group various entities acting in a system. The "In-House" group 334 may represent entities entitled to permissions reserved for in-house clients (such as those represented by In-House node 324).

In the example of FIG. 3A, there are entity nodes representing resources 360. One resource node corresponds to a Company A Segment 350, which, for purposes of this disclosure as described earlier, is items with a common feature. For example, Company A Segment 350 may represent data on customers or products related to Company A. Similarly, Segment #9 352 and Segment #3 354 may represent particular demographic data; for example, Segment #9 352 may be individuals interested in purchasing a TV in the next 6 months, while Segment #3 354 may be single women from ages 31-50. Item 42K 356 and Item 99W 358 each represent an individual product sold at Retailer A, such as a particular model TV or a particular book. In various embodiments, these types of resource nodes 360 may represent any type of resource, item, entity, or other asset to which access is desired. For example, time or processing cycles in a computer system, rental cars, files in a computer system, etc.

In the example of FIG. 3A, each of the resource nodes 360 is connected by a "Contents" edge to one or more resource group nodes 348, which as discussed herein represent a permission (e.g., a relationship) between the connected nodes, such that the resource group represented by the node from which the edge emanates contains the entities represented by the resource node at which the edge terminates. In this example, a Contents edge connects a group node for Company A Segments 340 to a resource node representing a Company A segment 350. Another Contents edge connects a "Public" group node 342 to resource nodes for Segment #9 352 and Segment #3 354. Another Contents edge connects a group node for Retailer A to resource nodes representing Item 42K 356 and Item 99W 358.

As evidenced by the example illustrated in FIG. 3A and described herein, the Group Nodes 336 each have different permissions representing what the members of the Group Nodes 336 are allowed to do with the Resource Group Nodes 348 and ultimately the contents of the Resource Group Nodes 348. For example, the Economy Level group 330 has a "canTarget" edge to the Public group 342. In the example of FIG. 3A, this permission type indicates that the Economy Level group 330 can "target" (e.g., have an ad served to) a resource in the Public group 342. Because the Public group 342 has Segment #9 352 and Segment #3 354 as "contents" (represented by the "Contents" edge), that means that members of the Economy Level group 330 (e.g., Company A) "can target" Segment #9 352 and Segment #3 354.

Similarly, the Premium Level group 332 has a "canTarget" edge to the Public group 342. In the example of FIG. 3A, the Premium Level group 332 also has a "getAnalytics" edge to the Retailer A group 344. Because the Retailer A group 344 has Item 42K 356 and Item 99W 358 as "contents" (represented by the "Contents" edge), that means that members of the Premium Level group 332 (e.g., Company B 322 and Company C 326) can "get analytics" for Item 42K 356 and Item 99W 358 (e.g., can see statistics associated with ad campaigns associated with the items). The lack of an edge or a path between nodes can indicate the lack of a permission between the entities represented by the nodes. For example, because Company A 320 does not have a "getAnalytics" edge to the Public group 342 or to Segment #9 352 and Segment #3 354, Company A 320 cannot perform the action associated with the get analytics permission on those entities; however, Company A 320 can "target" those entities.

As stated herein, each node may have multiple edges emanating from or arriving at it, each representing a different type of permission. According to an embodiment, each node corresponding to an entity or group and each edge corresponding to a permission is defined by an entry in a database. In various embodiments, each graph edge has a corresponding inverse edge, for example for traversal purposes, as discussed further herein. These inverse edges may be stored each time an edge is inserted into the graph. In an embodiment, resource groups 348 cannot have a permission edge starting at them, only ending at them. In an embodiment, actor groups 336 cannot have a permission edge ending at them, only starting at them.

Figure 3B:
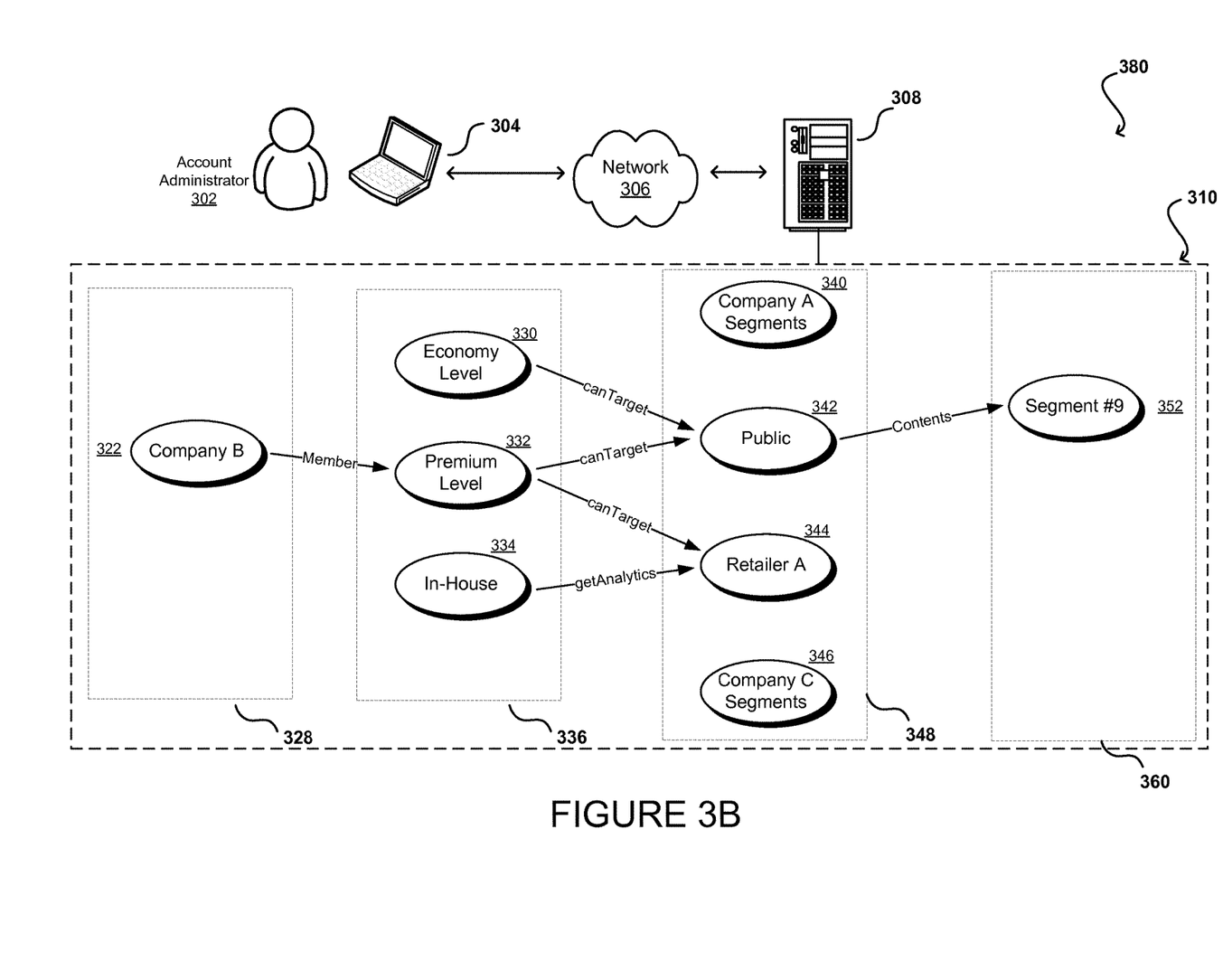
Figure 3C:
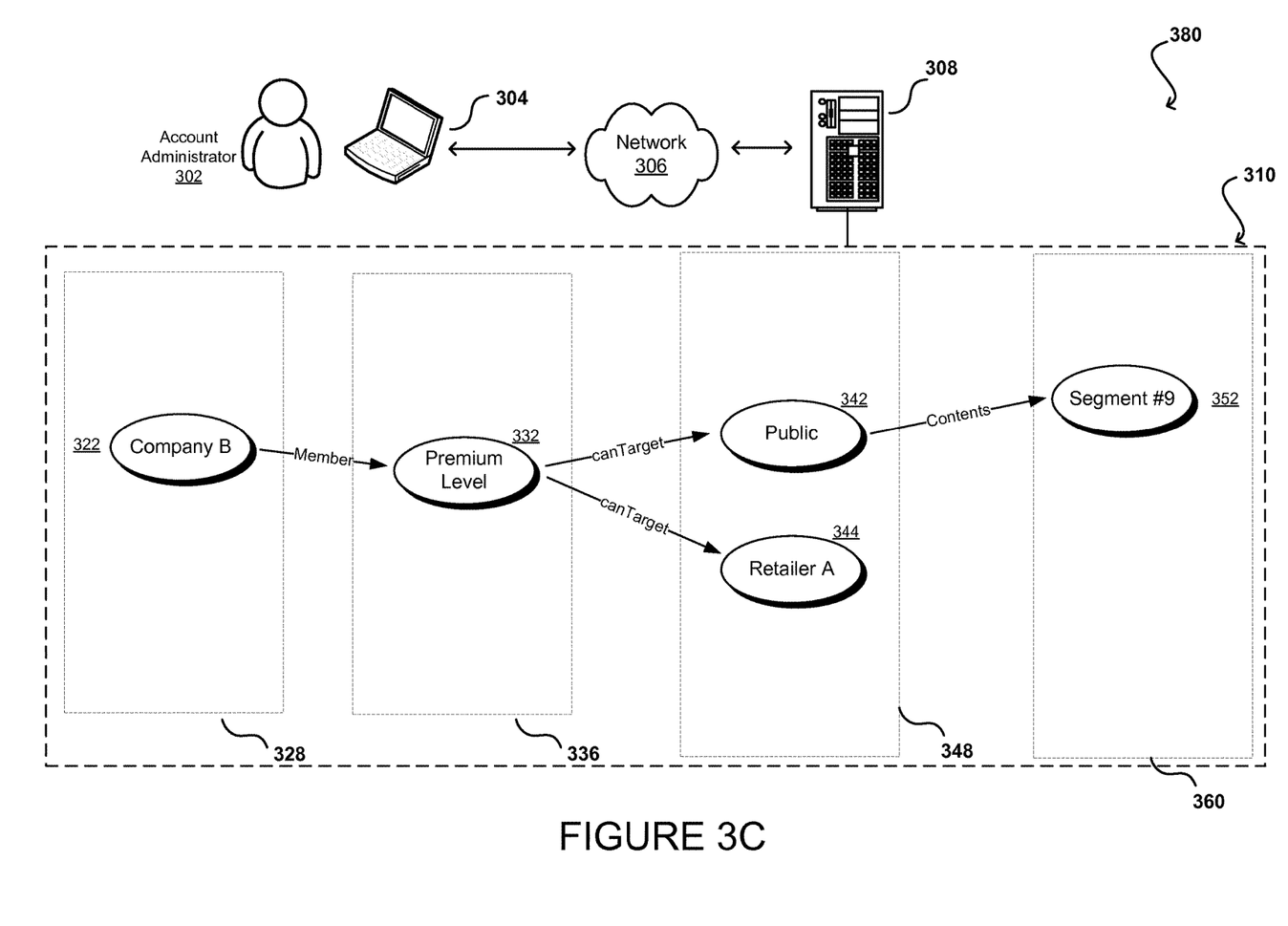

Significantly, in various embodiments, the graph 310 representing the permissions store may be comprised of one or more bipartite graphs of groups. In the example of FIGS. 3A-3C, each of the actor nodes 328, group nodes 336, resource group nodes 348, and resource nodes 360 are in a bipartite relationship with each other, although in other embodiments, for example, only the group nodes 336 and resource group nodes 348 may comprise a bipartite graph (e.g., the middle of the entire graph, not the fans on either side), while other parts of the graph 310 (e.g., fans) may be non-bipartite. In an embodiment, the group nodes 336 and resource group nodes 348 must comprise a bipartite graph. One embodiment contains a bipartite graph in the center of the graph 310 (e.g., group nodes 336 and resource group nodes 348), while graphs on the edges of the graph 310 comprise other types of graph relationships, such as tree structures or fan structures. For example, no edge connects one of the actor nodes 328 with another actor node 328. All edges in the graph 310 cross from one side of the graph to another. There are no edges connecting nodes of the same set. In some embodiments, the group nodes 336, the resource group nodes 348, and the edges connecting them comprise a bipartite graph, with fanout of nodes on either side.

FIGS. 3B and 3C illustrate an example approach 380 for traversing an enhanced permission graph to determine permissions in accordance with various embodiments. In FIGS. 3B and 3C, various elements have been removed from the figure solely for clarity.

In an example of an advertising system utilizing the disclosed techniques for permissions management, when a user (such as Company B 322) attempts to access a resource (such as Segment #9 352), a check is made to determine if the user has adequate permission to do so. This may encompass, for example, the user attempting to navigate to a particular web page in a web-based interface for advertising management, or selecting a data field, or performing some other action. In the example illustrated by FIGS. 3B and 3C, the determination of permission is accomplished by navigating the graph representing the permissions. In an embodiment, for the advertising system to determine the existence of a sufficient permission between, for example, Company B 322 and Segment #9 352, a command may be generated and executed on the graph store, such as "hasPermission ("Company B", "canTarget", "Segment #9"), which ultimately determines whether a permission exists for Company B 322 to target Segment #9 352.

According to an embodiment, determining a permission between nodes in the graph includes determining whether a path exists between the nodes along edges associated with the particular permission. In the example of FIGS. 3B and 3C, an attempt is being made to determine whether Company B may target Segment #9. While the example of FIGS. 3B and 3C do not contain many nodes, example embodiments exist where millions, if not billions, of nodes may be implicated in a simple permission inquiry. A naïve approach to determining a traversal between nodes in such graphs would be extremely inefficient and costly in terms of resources. For example, in an example with a million actor nodes 328 and a million resource nodes 360, attempting to traverse edges between the initial actor node in an attempt to determine whether a path exists to one target resource node could implicate an incredible number of edges.

However, one may ascertain that, especially in an embodiment of a graph with leaf nodes on the outside and a bipartite graph of group nodes on the inside, the single actor node likely belongs to a relatively small number of actor group nodes, and the target resource node likely belongs to a relatively small number of resource group nodes, if not having a direct edge in some situations. Because connections in the interior of the graph are likely sparse, if reads can be "pushed" to the sparse inner portion of the graph, traversals may be performed more cheaply. For example, cheaply may be defined in terms of the number of layers needed to be read plus the number of nodes. A greater number of layers can result in a higher cost (e.g., layers cannot be read in parallel because a determination of which layer or node to read depends on the results of previous reads). A node associated with a large number of edges may also be more expensive to read, because its data may be partitioned into multiple records. Therefore, embodiments of the techniques described herein limit read costs to a constant number of layers, thereby eliminating a source of expensive reads, and resulting in a more efficient use of computing resources.

Therefore, as illustrated in the example of FIG. 3B, according to an embodiment a determination of permissions may be accomplished by performing the following steps in parallel: determining that Company B 322 is a member of the Premium Level group 332 and determining that Segment #9 352 is contained in the Public resource group 342.

Then, as illustrated in the example of FIG. 3C, a step of determining if an edge associated with the "canTarget" action exists between the Premium Level group 332 and the Public resource group 342 is performed. According to an embodiment, all nodes (e.g., group, resource, etc.) are identified on which the Premium Level Group 332 has a permission, and then determining whether the target node is included in this list. In the example of FIG. 3C, it is determined that Public resource group 342 "contains" the sought-after Segment #9 352 is included in the nodes the Premium Level Group 332 has a permission on, and that the sought-after type of permission (e.g., "canTarget" vs. "getAnalytics") is associated with the edge connecting the Premium Level group 332 and the Public resource group 342. In the example of FIG. 3C, it is identified that the Premium Level group 332 has two directed edges connecting it with two different group nodes: Public resource group 342 and Retailer A group 344, but that only the directed edge connecting the Premium Level group 332 and the Public resource group 342 is of interest in this example. By walking inwards in the graph, a step of querying potentially massive numbers of nodes associated with group nodes may be avoided. Instead, a query involves determining whether an actor is a member of a group node, whether the target resource is a member of a resource group node, and then query the existence of an edge between the group nodes. According to an embodiment, the traversal logic is accomplished by following inverse edges between selected nodes and node groups.

In various embodiments, the permission check will return an affirmative value is there is a path across an edge corresponding to a permission associated with the requested action from an actor object to the requested resource object. For example, a determination will be made regarding which groups the actor node is in, and which nodes and/or groups of nodes the actor node has the corresponding permission on (i.e., connected edge of a particular type). Next, a determination will be made regarding which groups the requested resource is a member of. An intersection will be determined between the two sets of nodes returned from the determination. If there is anything contained in the intersection, then the permission is determined to exist. If there is nothing in the intersection, then another determination is made regarding which groups the actor node is in, and which nodes and/or groups the actor groups have the corresponding permission on (i.e., connected edge of a particular type). An intersection will again be performed, with a positive result indicating the existence of the permission; otherwise, no permission exists.

Figure 4:
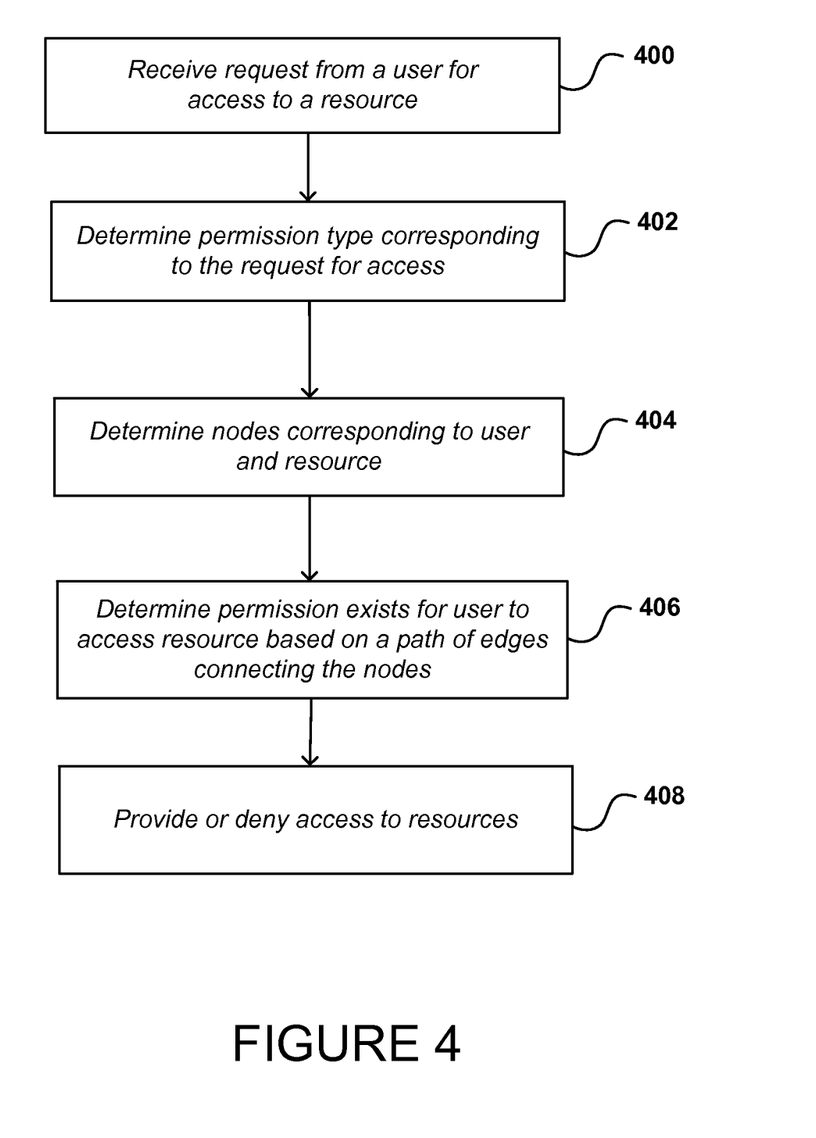
FIG. 4 illustrates an example process for utilizing an enhanced permissions management approach in accordance with various embodiments.

FIG. 4 illustrates an example process for utilizing an enhanced permissions management approach in accordance with various embodiments. A request is received 400 for access to a resource; for example, a user of a computer system for managing advertisements may request to target a specific advertising segment, or view analytics regarding a particular ad campaign associated with a product for sale at an online retailer's website. A permission type corresponding to the request is determined 402. For example, if the request is for access to analytics, then a particular permission with a corresponding name such as "getAnalytics" may be implicated. In various embodiments, all permissions in the graph store have an associated name, so they can be called (e.g., as part of a function call or a query).

The requestor, such as an individual or a business, is represented in the graph by a node, such as an "entity" node. The requested resource is also represented by an entity node. For purposes of this disclosure, while the nodes may be of the same type, they may be differentiated for clarity; for example, the requestor may be called an "actor node" and the resource may be called a "resource node." In order to determine whether the user may access the requested resource, a determination is made 406 regarding the graph as to whether the nodes representing the user and the resource are connected. According to various embodiments, this involves determining a path of edges linking the respective nodes, wherein at least one of the edges corresponds to the permission type determined earlier. If a path is determined, the access is granted 408.

Figure 5:
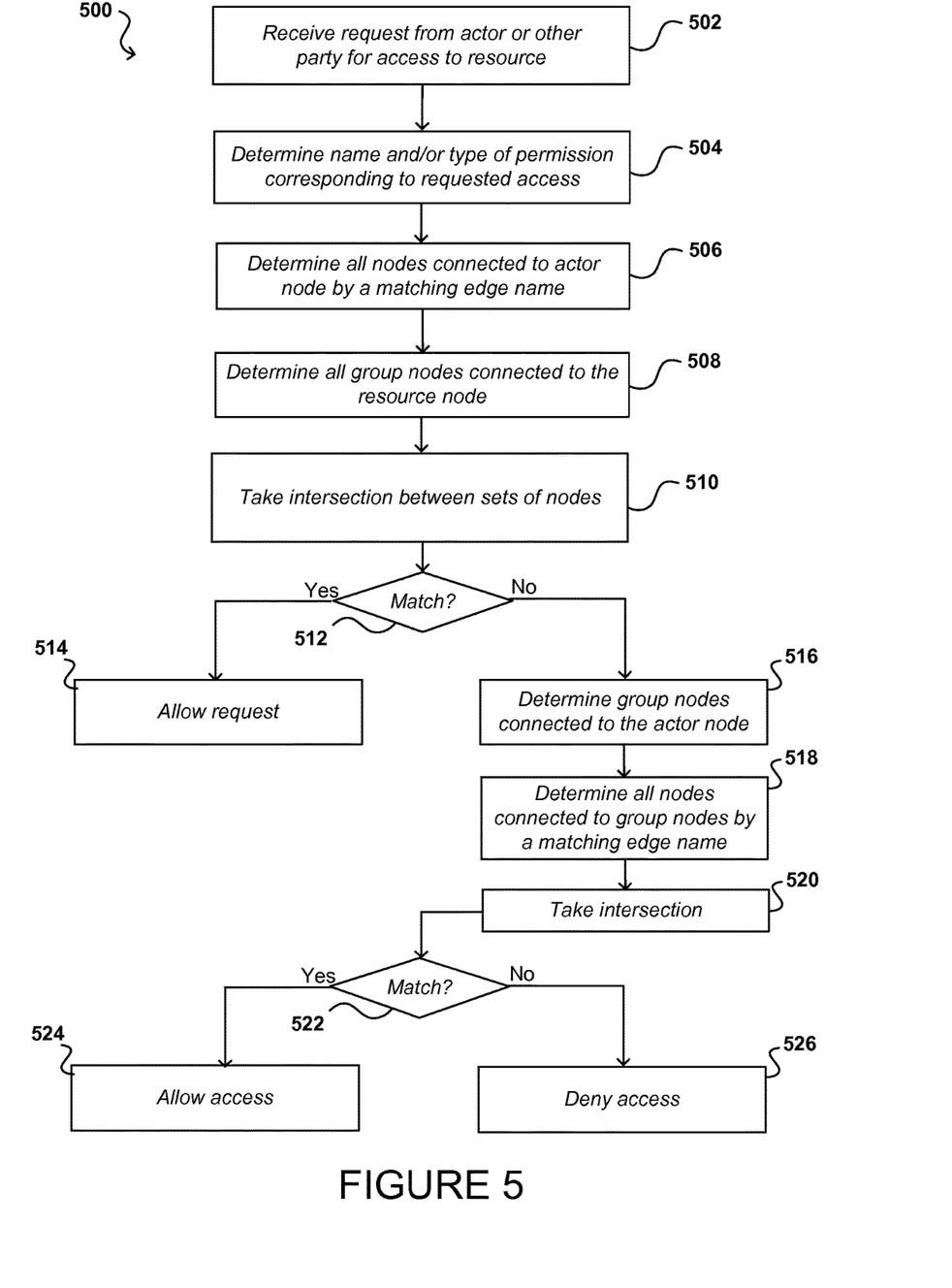
FIG. 5 illustrates an example process for utilizing an enhanced permissions management approach in accordance with various embodiments.

FIG. 5 illustrates an example process 500 for utilizing an enhanced permissions management approach in accordance with various embodiments. A request is received 502, for example from an actor (e.g., a client, a user, a business, etc.) (or a third party, for example, asking about the actor) for access to a resource (e.g., an advertising segment, analytics, etc.). In an embodiment, a permission to ask about the actor may be determined in a recursive manner using the techniques described herein. In another example, this request may be received via an Application Programming Interface (API) operable to receive requests, such as through a web service, for data to a connected computing system, such as a database, data store, graph store, permission store, etc. A determination is made 504 regarding a name of a permission corresponding to the type of access requested, type of resource requested, etc. In various embodiments, each permission is associated with a name (e.g., in a database) that may be used to identify particular permissions and associate the permissions with various request types.

According to an embodiment, a determination is made 506 of all nodes (e.g., in a graph, the graph which may be stored in various ways) connected to an "actor node" (e.g., a node in the graph associated with the actor) by an edge associated with a name that matches the determined name of the required permission. For example, this may include identifying nodes that serve as "groups" of resource nodes, or the individual resource nodes themselves. Next, all group nodes connected to the node associated with the requested resource are determined 508. An intersection 510 between the two sets of determined nodes is taken. A determination is made 512 whether any nodes is implicated in the intersection. If so, 514, then the request is allowed. Otherwise, a next determination 516 is made of all group nodes connected to the determined actor node, and all nodes connected to those group nodes by an edge, the name of which matches the determined name of the required permission 518. An intersection 520 of the determined sets is taken. If there is a node in the intersection 522, then the request is allowed 524. Otherwise, the request is denied 526.

Figure 6:
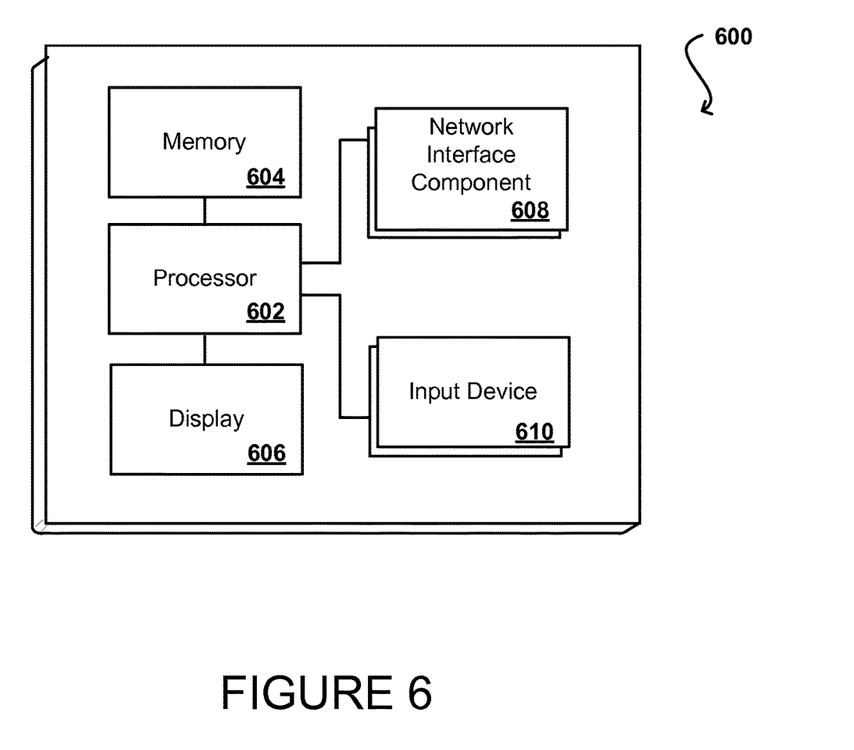
FIG. 6 illustrates a logical arrangement of a set of general components of an example computing device, in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
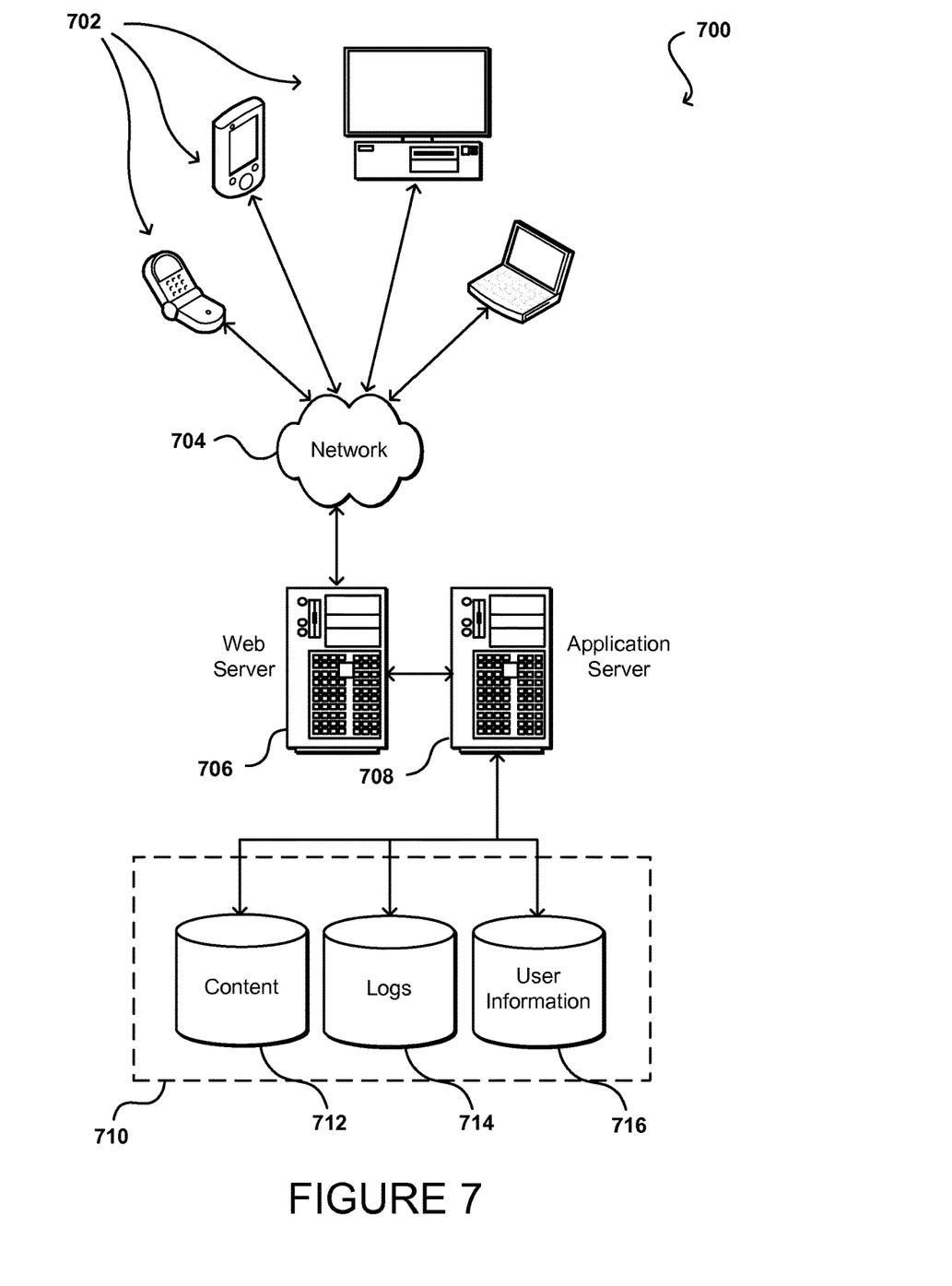
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases, graph stores, or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under the control of one or more computer systems configured with executable instructions,
   associating a first user account and a second user account with a user group, wherein the first user account, the second user account, and the user group are each represented by respective nodes stored in a graph data structure;
   generating a first directed edge in the graph data structure connecting the node of the first user account and the node of the user group, the first directed edge corresponding to the association of the first user account with the user group;
   generating a second directed edge in the graph data structure connecting the node of the second user account and the node of the user group, the second directed edge corresponding to the association of the second user account with the user group;
   associating a first demographic data set and a second demographic data set with a demographic data group, wherein the first demographic data set, the second demographic data set, and the demographic data group are each represented by respective nodes stored in the graph data structure;
   generating a third directed edge in the graph data structure connecting the node of the first demographic data set and the node of the demographic data group, the third directed edge corresponding to the association of the first demographic data set with the demographic data group;
   generating a fourth directed edge in the graph data structure connecting the node of the second demographic data set and the node of the demographic data group, the fourth directed edge corresponding to the association of the second demographic data set with the demographic data group;
   generating a fifth directed edge in the graph data structure connecting the node of the user group and the node of the demographic data group, the fifth directed edge corresponding to an access permission associated with the first and second demographic data set, and wherein the node of the user group, the node of the demographic data group, and the fifth edge comprise a bipartite graph;
   receiving, at the computer system from a user associated with the first user account, a request to access the first demographic data set;
   determining a path between the first user account and the first demographic data set along respective edges, the path including a first segment starting at the first user account and moving between respective bipartite graphs in a first direction, and a second segment starting at the first demographic data set and moving between respective bipartite graphs in a second direction, the first direction being opposite the second direction, wherein the first segment and the second segment are determined in parallel;
   determining starting points and end points of the respective segments forming the path, wherein segment access permissions of the respective segments are directional, and one or more of the respective groups restrict a permission direction;
   determining that the access is allowed, based at least in part on the permission corresponding to the fifth directed edge as determined by the path; and
   providing the first demographic data set to the user.

2. The computing method of claim 1, wherein determining that the access is allowed further comprises:
   determining that the node of the first user account is connected to the node of the user group;
   determining that the node of the first demographic data is connected to the node of the demographic data group;
   determining that the fifth directed edge connects the node of the user group and the node of the demographic data group;
   determining a permission associated with the request to access; and
   determining that the fifth directed edge corresponds to the determined permission.

3. The computing method of claim 1, wherein:
   the node of the user group, the node of the demographic data group, and the fifth edge comprise a first bipartite graph;
   the node of the first user account, the node of the second user account, the node of the user group, the first directed edge, and the second directed edge comprise a second bipartite graph; and the node of the first demographic data set, the node of the second demographic data set, the node of the demographic data group, the third directed edge, and the fourth directed edge comprise a third bipartite graph.

4. The computing method of claim 2, wherein determining that the fifth directed edge corresponds to the determined permission further comprises:

determining an identifier associated with the determined permission; and determining that the identifier matches an identifier associated with the fifth directed edge.

\* \* \* \* \*